Figure 1:
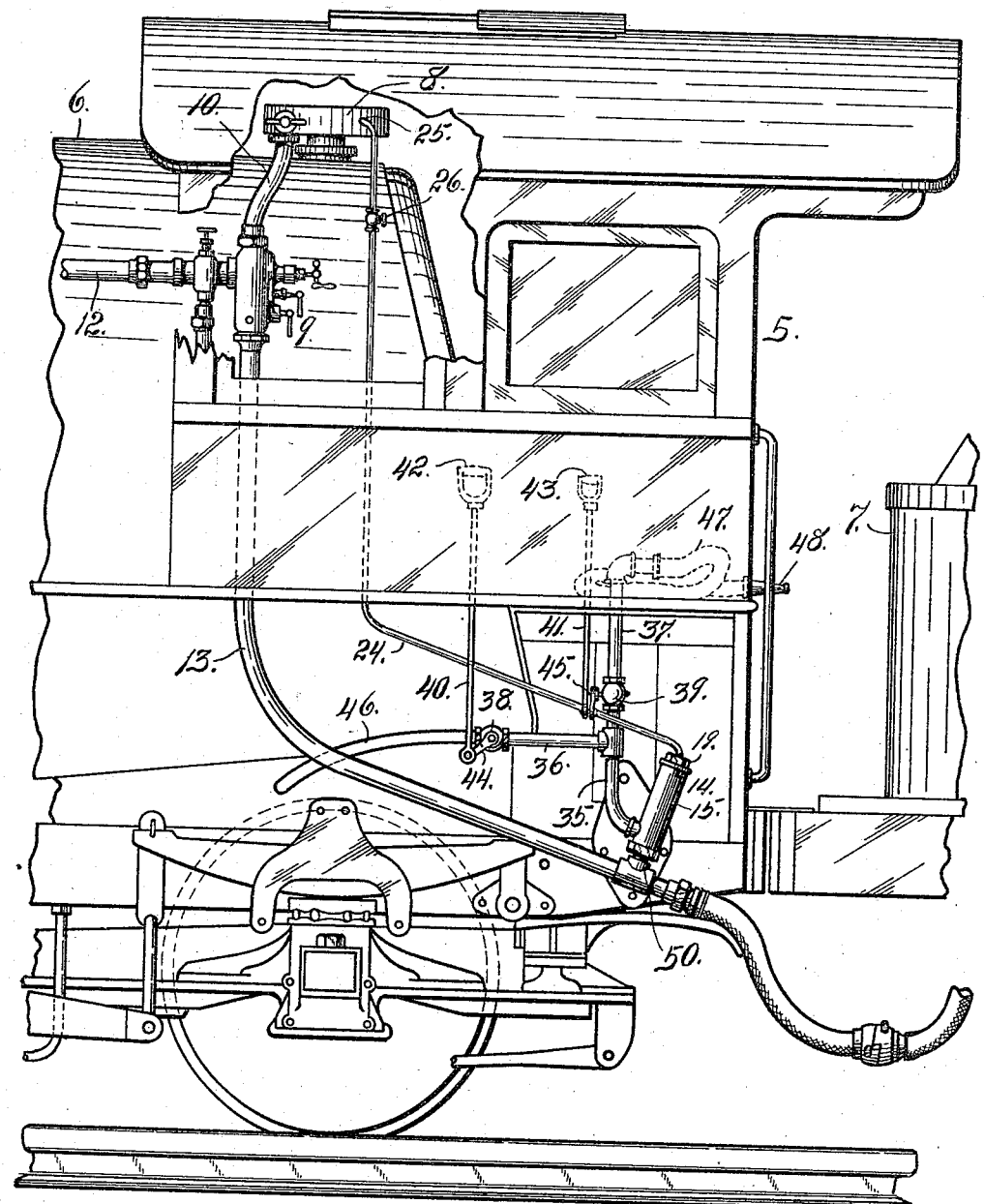

J. M. DAVIS.
SPRINKLING ATTACHMENT FOR LOCOMOTIVES.
APPLICATION FILED SEPT. 5, 1914.

1,183,542.

Patented May 16, 1916.
2 SHEETS—SHEET 1.

Witnesses
Otto E. Hoddick
John B. Gade

Inventor
James M. Davis
By A. J. O'Brien
Attorneys

J. M. DAVIS.
SPRINKLING ATTACHMENT FOR LOCOMOTIVES.
APPLICATION FILED SEPT. 5, 1914.
1,183,542.
Patented May 16, 1916.
2 SHEETS—SHEET 2.
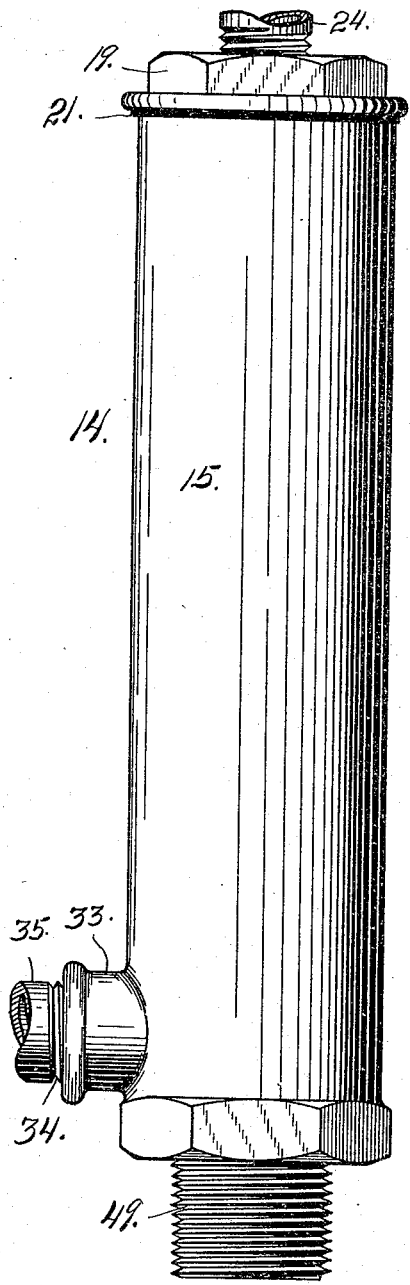
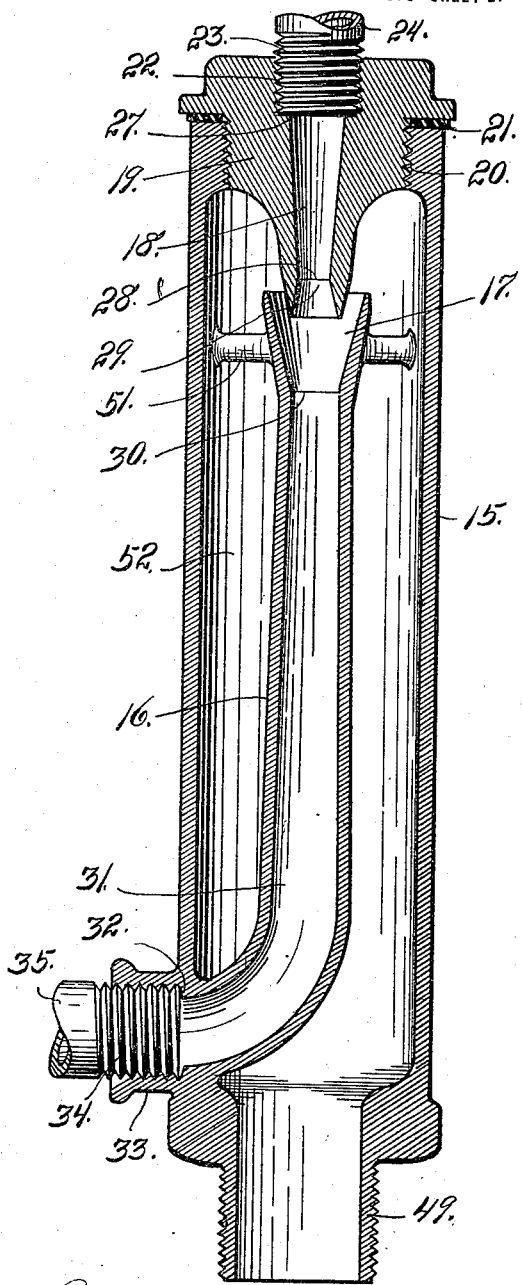
Witnesses
Otto E. Hoddick.
John B. Cade.
Inventor
James M. Davis.
By A. J. O'Brien
Attorneys

UNITED STATES PATENT OFFICE.

JAMES M. DAVIS, OF DENVER, COLORADO.

SPRINKLING ATTACHMENT FOR LOCOMOTIVES.

1,183,542.     Specification of Letters Patent.     Patented May 16, 1916.

Application filed September 5, 1914. Serial No. 860,448.

*To all whom it may concern:*

Be it known that I, JAMES M. DAVIS, citizen of the United States, residing in the city and county of Denver and State of Colorado, have invented certain new and useful Improvements in Sprinkling Attachments for Locomotives; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a sprinkling or spraying device, particularly well adapted for use in connection with locomotives, for spraying or sprinkling the coal and for sprinkling the ashes in the ash pan, the object in both cases being to keep down the dust. Heretofore, so far as I am aware, this sprinkling has been done by directly connecting a conduit with the branch pipe connected with the injector. The difficulty of this arrangement is that the water used for spraying or sprinkling purposes is exceedingly hot, as the steam is taken directly from the boiler through the injector and a comparatively large quantity of steam is required, owing to the fact that the connection of the sprinkling conduit with the branch pipe of the injector is considerably above the source of water supply, or the level of the water in the tank of the tender from which the water is drawn, on the injector principle. This hot water is very objectionable as many accidents occur, due to its use, whereby employees are scalded and seriously injured, with the result that railroad companies, where this system is in vogue, are subjected to many damage suits.

The necessity for a different apparatus has long been realized, but so far as I am aware, has not heretofore been produced.

My improvement consists in locating a spraying device or a sort of ejector, below the level of the water in the tank carried by the tender, and connecting the said device with the dry steam of the boiler by means of a relatively small pipe, since a comparatively small volume of steam is required, due to the fact that the sprinkling or spraying device is located below the level of the water in the supply source and therefore, is constantly filled with water so that no force is required to bring the water into position to be acted on by the force of the steam which drives it through the pipes or conduits utilized for sprinkling purposes. This sprinkling device is connected at its lower extremity with the feed-water pipe, at its upper extremity with the steam jet, while near its lower extremity a discharge pipe is connected, from which branch conduits are taken for sprinkling purposes, each of said conduits being provided with a valve adapted to be controlled by the fireman or other person whose business it is to look after matters of this kind.

Having briefly outlined my improved construction, I will proceed to describe the same in detail, reference being made to the accompanying drawing, in which is illustrated an embodiment thereof.

In this drawing,—Figure 1 is a fragmentary view of a locomotive, showing the rear part thereof, to which my improvement is applied. Fig. 2 is a detail elevation of my improved sprinkling attachment, shown on a larger scale than in Fig. 1. Fig. 3 is a central longitudinal section of the same.

The same reference characters indicate the same parts in all the views.

Let the numeral 5 designate the cab of a locomotive, 6 the boiler and 7 the tender upon which the water tank is mounted in the usual manner. The rear extremity of the boiler is equipped with the usual fountain or dome 8 which extends above the top of the boiler and contains dry steam only. The injector 9 receives its steam from this fountain by way of a pipe or conduit 10. The branch pipe leading from the injector to the boiler for water supplying purposes, is designated 12; while the feed-water pipe leading from the source of water supply to the injector is designated 13. The injector proper has nothing to do with my present invention, but it has been thought best to previously explain the relative location of my improvement to the injector and other ordinary parts of the locomotive, which have just been mentioned.

My improved device which, so far as its structural novelty is concerned, may be designated in its entirety by the numeral 14, and consists of an outer casing 15 and an inner tubular member 16 centrally located and open at its upper extremity as shown at 17, to receive steam through a pipe 18 formed in a plug 19 which is threaded into the upper part of the casing 15, as shown at 20, a gasket 21 being employed in order to make the device fluid tight at this extremity. Into the upper part of the screw plug is threaded, as shown at 22, the lower extremity 23 of a relatively small pipe 24, whose opposite extremity is connected with the fountain 25 or the source of dry steam taken from the boiler 6. This pipe 24 is provided with a controlling valve 26.

The passage 18 formed in the screw plug 19 is relatively large at its outer extremity, as shown at 27, and tapers gradually toward its free extremity until a point 28 is reached, where the diameter of the passage is smallest. From this point the passage gradually enlarges as shown at 29, to its free or discharge end, whence the steam passes into the upper open extremity 17 of the inner tube 16. This part 17 of the tube is relatively large at its upper extremity and gradually diminishes in diameter to a point 30 from which the diameter of the tube 16 gradually enlarges until a point located approximately as indicated by the numeral 31 is reached, from which the diameter of the tube remains the same until the outer extremity 32 is reached. From this outer extremity an interiorly threaded collar 33 is formed, into which is screwed as shown at 34, a discharge pipe 35 from which leads a pipe 36 and a second branch pipe 37, for sprinkling purposes. The branch pipe 36 is provided with a controlling valve 38 and the branch 37 with a similar valve 39. These valves are respectively controlled by rods 40 and 41, whose upper extremities are equipped to be manipulated by the hand, as shown at 42 and 43. The lower extremity of the rod 40 is connected with a crank 44 which is connected with the valve piece for operating purposes. The lower extremity of the rod 41 is connected with a similar crank 45 for regulating the valve piece of the valve 39. Beyond the valves, the two branch pipes 36 and 37 are equipped with extensions 46 and 47, which may be supplied with suitable sprinkling apparatus. For instance, the extension 47, as illustrated in the drawing, is shown as a flexible hose pipe equipped with a sprinkling nozzle 48. These features may be varied at will or as circumstances may require.

The lower extremity of the casing 15 is provided with an inlet nipple 49 which is connected, as shown at 50, with the feed-water supply pipe 46, at a point considerably below the level of the water in a source of supply on the tender. In fact, the entire spraying device is located below the level of the water supply source, and consequently, the casing 15 is constantly filled with water.

The inner tube 16 of the device, as illustrated in the drawing, is cast integral with the outer casing, its upper extremity being connected therewith by means of arms 51, while the lower extremity merges into the outer wall of the casing. By virtue of this construction, there is a relatively large water space 52 within the casing 15 and surrounding the tube 16. Hence, as a jet of steam is delivered into the upper extremity of the tube 16, the water which fills the tube and surrounding space within the casing, will be driven by the force of the steam, outward, through the discharge pipe 35, and thence through either of the branch pipes 36 or 37, depending upon which of the valves 38 or 39 is open.

From the foregoing description, the use and operation of my improvement may be readily understood. As heretofore stated, the supply of steam to my improved sprinkling or spraying device is comparatively small, a large volume not being required because of the fact that the casing 15 is below the water level of the supply source and consequently, constantly filled with water. Hence, the volume of steam required is small as compared with that ordinarily needed where the water for sprinkling purposes is taken directly from the branch pipe 12, as heretofore explained. A discharge of steam through the contracted branch 18 into the upper extremity of a tube 16, forces the water through the tube and out, with the necessary force for spraying or sprinkling purposes, the supply of water being constant by gravity pressure from the source, by way of the feed pipe 13.

In addition to the advantages of my improved device, over the apparatus heretofore in vogue, I desire to call attention to the fact that when my improvement is in use, the injector is idle. In other words, by the employment of my improved device, the wear and tear on the injector during the sprinkling operation is entirely avoided whereas, under the system heretofore employed, the injector was necessarily brought into requisition during the sprinkling operation.

While, as illustrated in the drawing, my improved sprinkling device is shown in connection with a locomotive and employed for sprinkling the coal and ashes for the purpose of keeping down the dust, it is evident that it may be employed in other relations as well, or wherever steam is used to force water from a supply source through the medium of an ejector device, the latter being arranged as illustrated in the drawing and heretofore described.

Having thus described my invention, what I claim is,—

1. In sprinkling apparatus, the combination with a steam supply pipe and a water supply pipe, of a casing open at both extremities which are respectively connected with the steam and water supply pipes, the said casing having a relatively small tube located therein and open at one end within the casing, to receive steam, its opposite extremity formed integral with the wall of the casing and registering with an opening in the latter.

2. In a sprinkling apparatus, a casing having a relatively small tube located therein, one extremity of which is formed integral with the said casing and registers with a lateral discharge opening in the latter, the other extremity of the tube being open within the casing, a cap fitted into one extremity of the casing and having a passage therethrough which registers with the open end of the tube, said cap adapted to be connected with a steam supply pipe and the opposite extremity of the casing with a water supply pipe.

3. In a sprinkling apparatus, a casing having a relatively small tube located therein, one extremity of which is formed integral with the said casing and registers with a lateral discharge opening in the latter, the other extremity of the tube being open within the casing, a cap fitted into one extremity of the casing and having a passage therethrough which registers with the open end of the tube and projects thereinto, said cap adapted to be connected with a steam supply pipe and the opposite extremity of the casing with a water supply pipe.

In testimony whereof I affix my signature in presence of two witnesses.

JAMES M. DAVIS.

Witnesses:
MAZE KIRBY,
A. EBERT O'BRIEN.

Copies of this patent may be obtained for five cents each, by addressing the "Commissioner of Patents, Washington, D. C."